US006998990B2

(12) United States Patent
Johnson

(10) Patent No.: US 6,998,990 B2
(45) Date of Patent: Feb. 14, 2006

(54) AUTO SHUTOFF OVERFLOW CONTROLLER

(76) Inventor: Steve Johnson, 3 Windsor Ct., Algonquin, IL (US) 60102

( * ) Notice: Subject to any disclaimer, the term of this patent is extended or adjusted under 35 U.S.C. 154(b) by 62 days.

(21) Appl. No.: 10/656,442

(22) Filed: Sep. 8, 2003

(65) Prior Publication Data

US 2005/0062611 A1    Mar. 24, 2005

(51) Int. Cl.
*G08B 21/00*    (2006.01)

(52) U.S. Cl. ................ 340/620; 340/618; 137/312; 68/208

(58) Field of Classification Search ............ 340/612, 340/616, 618, 620, 605; 137/312; 68/208
See application file for complete search history.

(56) References Cited

U.S. PATENT DOCUMENTS

| | | | | |
|---|---|---|---|---|
| 3,588,859 A | * | 6/1971 | Petree | 340/620 |
| 4,418,712 A | * | 12/1983 | Braley | 137/312 |
| 4,612,949 A | * | 9/1986 | Henson | 137/2 |
| 5,028,910 A | * | 7/1991 | Meacham et al. | 340/616 |
| 5,216,288 A | * | 6/1993 | Greene | 307/118 |
| 5,240,022 A | * | 8/1993 | Franklin | 137/1 |
| 5,493,877 A | * | 2/1996 | Wickremasinghe | 68/208 |
| 6,154,144 A | * | 11/2000 | Johnson | 340/620 |
| 2005/0051213 A1 | * | 3/2005 | Clemens | 137/392 |

* cited by examiner

*Primary Examiner*—Jeffery Hofsass
*Assistant Examiner*—Anne V. Lai
(74) *Attorney, Agent, or Firm*—Kajane McManus

(57) ABSTRACT

The automatic shutoff overflow controller comprises a circuit which engages between a source of power and a water processing device, the controller, sensing an undesirably high water level in a liquid containment into which water drains from the device, shutting off the device and producing an audible warning that such condition exists.

9 Claims, 3 Drawing Sheets

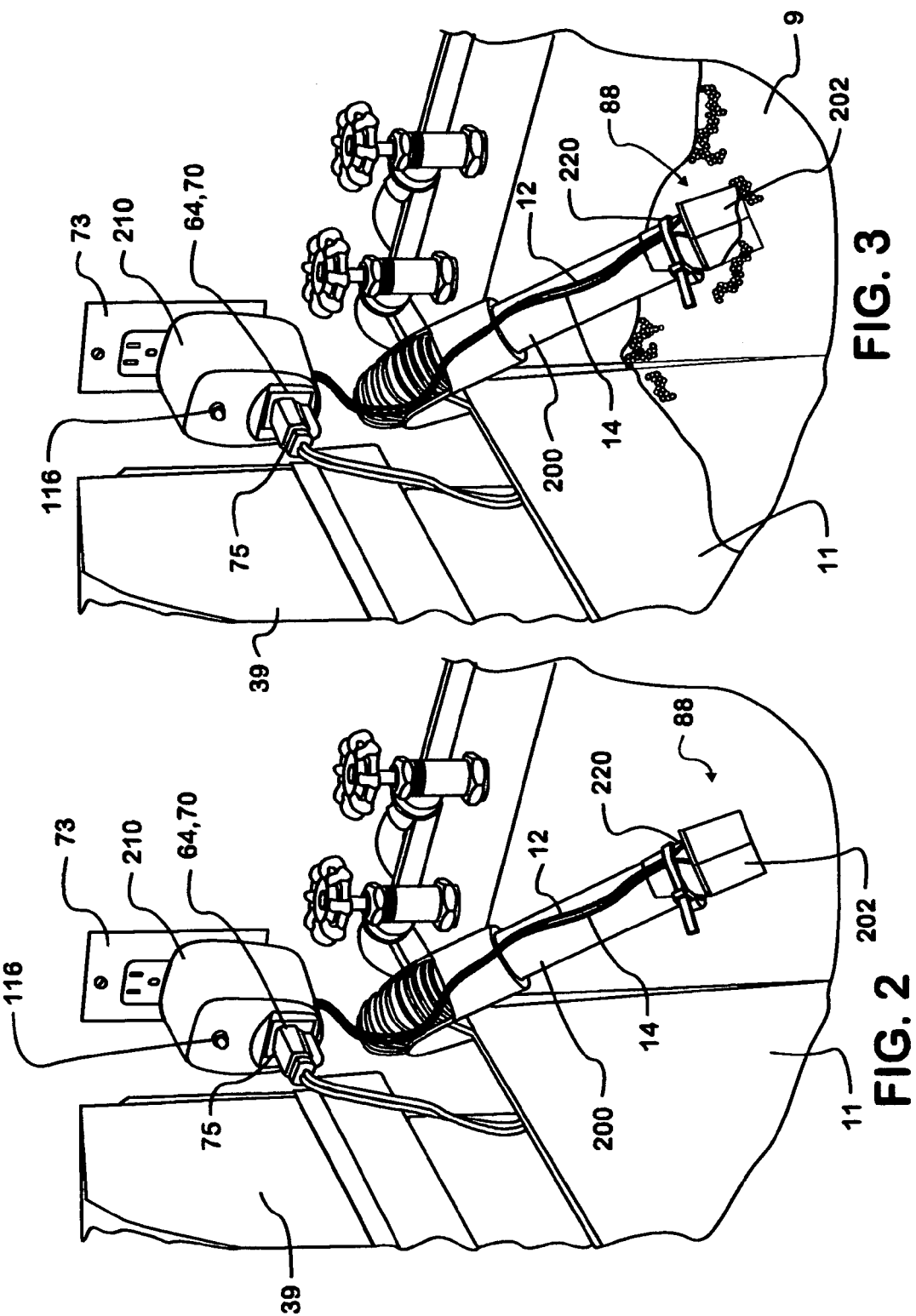

AUTO SHUTOFF OVERFLOW CONTROLLER

BACKGROUND OF THE INVENTION

1. Field of the Invention

The present invention relates to an overflow controller with automatic water shutoff capability. More particularly, the controller is proposed for use in disabling a water processing device temporarily when an excessive level of conductive fluid is detected in an outflow container, such as a utility sink, used for receiving fluid draining from the water processing device.

2. Prior Art

Heretofore numerous structures have been proposed for controlling fluid levels in a fluid container and/or for shutting off a source of the fluid upon detection of an excessive level of the fluid.

As will be described in greater detail hereinafter, it is believed that the controller of the present invention offers a simpler yet more featureful controller than those previously disclosed.

SUMMARY OF THE INVENTION

According to the invention there is provided an automatic shutoff overflow controller for use in shutting off a powered liquid processing device when an undesirably high level of liquid is sensed in a liquid containment for liquid draining from the device, the controller comprising a circuit engaged between the device and a source of power therefor and including conductive sensor probes placed at a desired level within the liquid containment and, when the probes becomes immersed in liquid, causing an audible warning to be produced and interrupting the flow of power from the source to the device.

BRIEF DESCRIPTION OF THE DRAWINGS

FIG. 2 is a perspective view of the controller showing same plugged into a household power outlet and having a plug of a washer plugged into a power outlet thereof with a sensor of the controller shown engaged at an outlet end of a water drain hose of the washer received within a utility sink, as an example, showing the sink with a fluid level below the level of the sensor.

FIG. 3 is similar to FIG. 2 but shows a fluid level in the sink which is in contact with the sensor.

DESCRIPTION OF THE PREFERRED EMBODIMENT

Figure 1:
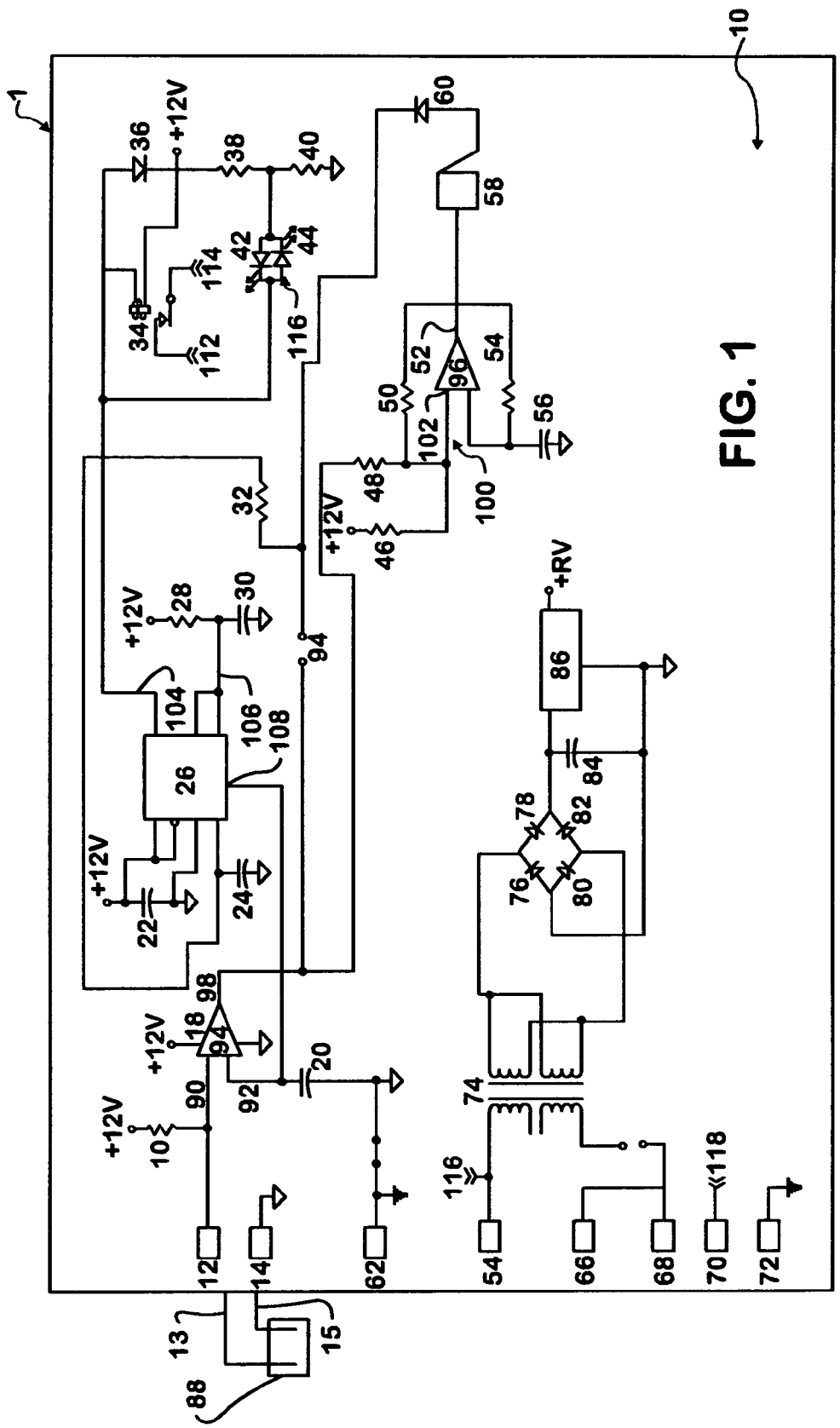
FIG. 1 is a detailed schematic diagram of the circuit defining the controller of the present invention.
Figure 4:
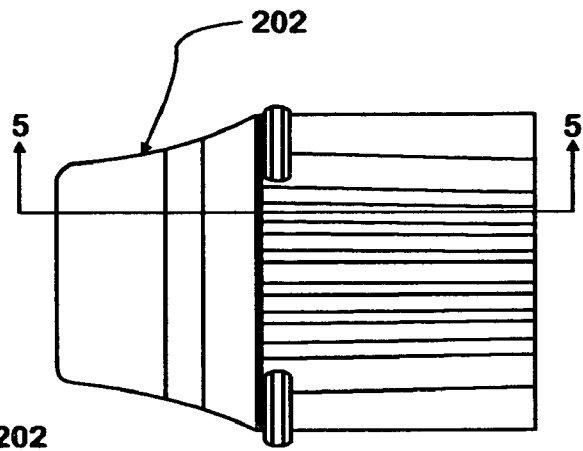
FIG. 4 is a top plan view of the sensor housing.
Figure 6:
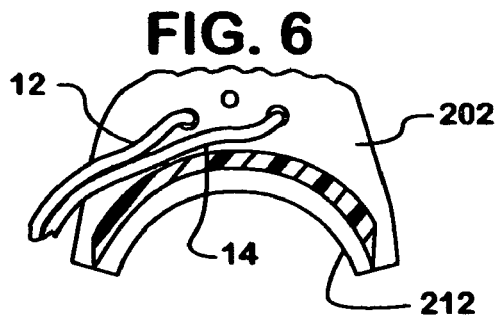
FIG. 6 is a cross sectional view taken along line 6—6 of FIG. 5.
Figure 5:
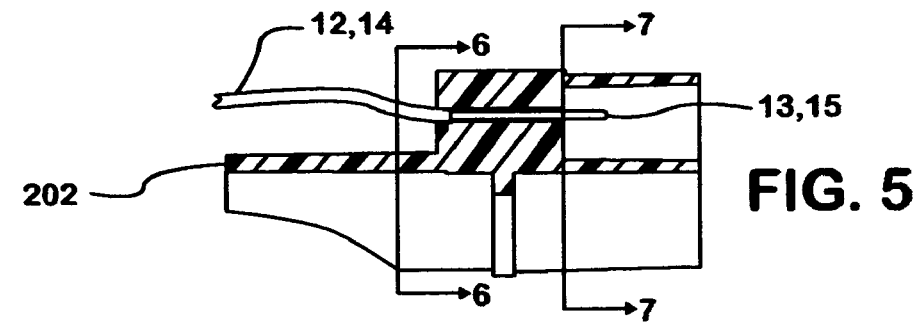
FIG. 5 is a cross sectional view through the housing taken along line 5—5 of FIG. 4.
Figure 7:
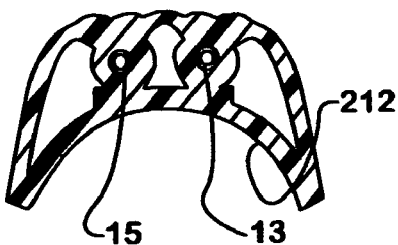
FIG. 7 is a cross sectional view taken along line 7—7 of FIG. 5.
Figure 8:
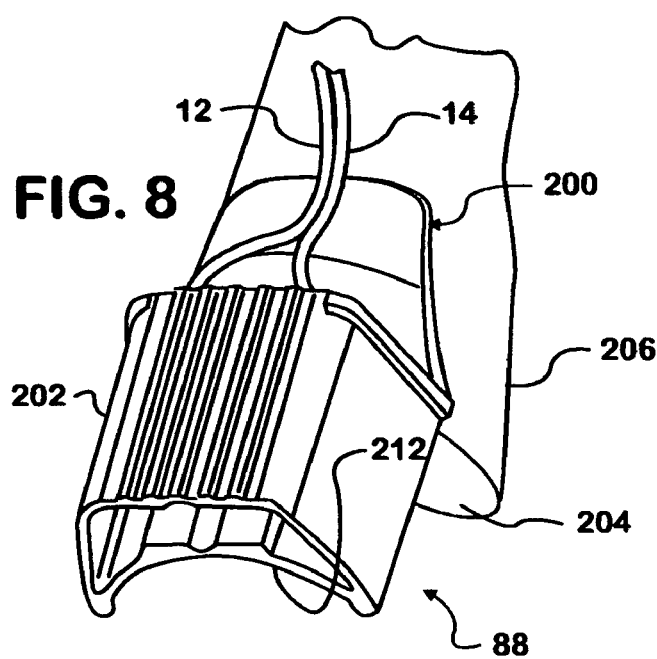
FIG. 8 is a perspective view of the sensor.

Referring now to the drawings in greater detail, there is illustrated in FIG. 1 a schematic circuit diagram of the auto shutoff overflow controller 1 of the present invention generally identified by reference numeral 10.

It will be understood that this circuit 10 is intended for use in situations where a conductive liquid 9, such as water, can rise above a desired level to overflow a containment 11 therefore. The circuit 10, when activated, acts to stop a flow of water into the containment 11, by shuting off a washing machine or similar appliance when the level of liquid draining therefrom has been determined to have risen above a desired level.

Beginning at the left of the Figure, connectors 12, 14 for an external probe sensor assembly 88 are shown. In this circuit 10, one of two conductive electrodes 13 of the assembly 88 is held at +12V through a 330 K ohm resistor 16. The presence of this voltage at a positive input 90 of an operational amplifier 18, which operates in this case as a comparator 94, forces an output 98 of the operational amplifier to be maintained at +12V. An oscillator section 100 is comprised of an operational amplifier 96, four 470 K ohm resistors 46, 48, 50 and 54, a 2.2 µF capacitor 56, a diode 60, and an audio signal generator 58, with the oscillator section 100 being normally held in an inactive state.

A 555 timer 26 is also provided and is in a ready state, with an output 104 thereof held low. This condition produces a high level of current at output 104, turning on a relay 34 and causing a green section 42 of a light emitting diode (LED) 116 to illuminate through a 470 ohm resistor 38. When the relay 34 is enabled, the normally open contacts 112, 114, controlling a device 39 or the line being monitored, are held closed, allowing AC power to flow in a control circuit atria defined by connectors 64 and 70.

At the same time, a negative input 92 of operational amplifier 18 is held at approximately +8V by connection to a control/reference output 108 of timer 26.

In an overflow condition, the presence of a conductive liquid between conductive electrodes 13 and 15, with electrode 15 being tied to ground of assembly 88, causes current to flow in 330 K ohm resistor 16. When current flow is sufficient to cause a voltage drop of greater than approximately 8 volts across 330 K ohm resistor 16, the output 98 of operational amplifier 18 will also drop to a low voltage of approximately 0.3 volts.

When this low voltage appears at the connection of a 330 K ohm resistor 32, a diode 60, and a trigger input 110 of timer 26 through a 470 K ohm resistor 48, the output 52 of operational amplifier section 96 rises to +12 V. This voltage increase has two effects.

First, the audio signal generator 58 is powered up and begins to emit a warning tone. The return path for current driving audio signal generator 58 takes the current through diode 60, which ensures that an audible signal cannot be produced by stray current when the circuit 10 is inactive.

Second, the voltage increase charges 2.2 µF capacitor 56, which is initially in a discharged state, through 470 K ohm resistor 54. When the voltage on 2.2 µF capacitor 56 rises to a level of voltage present at input 102 of operational amplifier 96, the output 52 of operational amplifier 96 switches to a low state, shutting off the audio signal generator 58 and causing 2.2 µF capacitor 56 to discharge through 470 K ohm resistor 54. The time required for the charge/discharge cycle is approximately one second, obtained by multiplying 470 K ohms by 2.2 µF, (54×56) producing an intermittent signal by causing the audio signal generator 58 to operate for one second, then become disabled for one second, until conductive liquid in contact with probe sensor assembly 88 is removed.

Resistors 46, 48, and 50 form a voltage divider applying approximately 4 volts at input 102 of operational amplifier 96 when the output 52 thereof is low, and about 8 volts at input 102 when the output 52 is high, causing an oscillation of capacitor 56 voltage between 4 and 8 volts while circuit 10 is active.

A further effect of the low signal at operational amplifier 18 is to cause the timer 26 to begin a timing cycle. A 47 μF capacitor 30 begins to charge through a 680 K ohm resistor 28. When the voltage on 47 μF capacitor 30 reaches ⅔ of the power supply voltage (12V), the output 104 of the timer 26 will go high. This time is approximately 35 seconds (1.1×. 30×26). An output 106 of timer 26 then discharges 47 μF capacitor 30 and the circuit is held in this state until the low voltage level at trigger pin 110 of timer 26 is raised by decreasing the level of conductive liquid present to a level below that of the probe sensor assembly 88.

When the output 104 of timer 26 goes high, the green light emitting diode 42 turns off and a red section 44 of LED 116 turns on, powered through 470 ohm resistor 40, and relay 34 is de-energized, closing normally open control circuit contacts 112, 114, engaged within the positive (hot) line of atria connectors 64, 70 and disabling the appliance connected to atria connectors 64, 70 via plug 75.

Power for the circuit 10 is provided by step down transformer 74, which reduces the AC supply voltage to approximately 18 volts.

This AC voltage is rectified to pulsating DC by rectifier bridge diodes 76, 78, 80, and 82, and the pulsating DC is smoothed by a 470 μF capacitor 84. A regulator 86 takes the smoothed DC voltage and regulates it down to +12V to operate the circuit 10.

A diode 36 is included to prevent the relay 34 coil from generating harmful transients when the relay 34 is de-energized.

A 0.01 μF capacitor 20 is included to filter the reference voltage at output 108 of timer 26 and to provide a low impedance path to ground for any electrical noise that may be picked up at this sensitive point of circuit 10.

Connectors 64, 66, 72 connect to a source of AC power 73 to operate both the circuit 10 and the controlled device 39 engaged to the atria 64, 70 thereof.

FIGS. 2 through 8 depict the physical configuration of the controller 11 as well as showing same in an exemplary environment of use.

FIGS. 2 and 3 are similar except for the level of water 9 in the containment 11 into which the device 39, here a washer 39, drains its contents via a drain hose 200.

The housing 202 of the probe sensor assembly 88 is shown engaged adjacent to and extending past an outlet opening 204 of the drain hose 200 of the washer 39.

Washer 39 plugs into a receptacle 64, 70 via plug 75 for same in the controller circuit housing 210 which in turn plugs into the source of power 73.

The connectors 12, 14 extend from the sensor housing 202 to the controller circuit housing 210, placing probes 13 and 15 within the sensor housing 202 into electrical communication with the controller circuitry 10.

Obviously, when the water 9 contacts the probe housing 202 as shown in FIG. 3, it forms a complete circuit across the probes 13 and 15, turning on the red section 44 of the LED 116 and simultaneously cutting off power to the washer 39.

Turning to FIGS. 4–8, it will be understood that the sensor housing 202 has the two sensors 13 and 15 mounted therein, and that it attaches to the outlet end 206 of drain hose 200, having a concave undersurface 206, which eases engagement thereof to the end of the hose 200.

Also, the connectors 12 and 14 which extend from the probes 13 and 15 respectively, are better illustrated here.

Attachment of the probe housing 202 to the hose 200 may be formed in any suitable manner, and use of strap 220 shown in FIGS. 2 and 3 should not be construed as limiting.

As described above, the simple circuit 10 provides a number of advantages, some of which have been described above and other of which are inherent in the invention. Also, modifications may be proposed to the circuit 10 without departing from the teachings herein. Accordingly, the scope of the invention is only to be limited as necessitated by the accompanying claims.

I claim:

1. An automatic shutoff overflow controller for use in shutting off a powered liquid processing device when an undesirably high level of liquid is sensed in a liquid containment for liquid draining from the device, the controller comprising a sensor circuit engaged between the device and a source of power therefor and including conductive sensor probes placed at a desired level within the liquid containment such that, when the probes become immersed in liquid, an audible warning is produced and flow of power from the source to the device is interrupted, the sensor probes being mounted in a housing, the housing being engaged to an outlet end of an outlet hose from the device and the housing including an open end into which the probes extend, the open end of the sensor housing being adjacent to and extended beyond the outlet opening of the outlet hose.

2. The controller of claim 1 wherein the circuit includes a connector engaged to a source of power.

3. The controller of claim 2 wherein the circuit further includes an atria to which the device is electrically engaged.

4. The controller of claim 3 wherein a normally open relay is positioned between the connector and the atria.

5. The controller of claim 4 wherein a comparator is functionally engaged to the relay in a manner to cause closing of contacts of the relay when voltage across the probes exceeds a reference voltage to effectively disconnect the device from the source of power.

6. The controller of claim 5 wherein the comparator also powers on an audio signal generator upon closing the relay contacts.

7. The controller of claim 6 wherein the circuit includes a timer for causing the audio signal generator to cycle on and off when the relay contacts are closed.

8. The controller of claim 7 wherein the circuit includes a visual indicator of the status thereof which is normally green and changes to red when the relay contacts are closed.

9. The controller of claim 8 wherein the circuit is reset when sufficient liquid is removed from the containment therefor to decrease the liquid to a level below the probes.

* * * * *